March 12, 1929.  H. J. IRWIN  1,705,117
LIQUID COOLER
Filed June 16, 1926

INVENTOR
Henry J. Irwin
BY
Wm Bodge ATTORNEY

Patented Mar. 12, 1929.

1,705,117

UNITED STATES PATENT OFFICE.

HENRY J. IRWIN, OF JERSEY CITY, NEW JERSEY, ASSIGNOR, BY MESNE ASSIGNMENTS, TO CROWN CORK & SEAL COMPANY, INC., OF NEW YORK, N. Y., A CORPORATION OF NEW YORK.

LIQUID COOLER.

Application filed June 16, 1926. Serial No. 116,412.

The invention relates generally to liquid coolers in which the cooling action is obtained by indirect contact with melting ice. In the present application the invention has reference more particularly to the treatment of water and other liquids intended for carbonation.

It has been common practice heretofore to pass the water to be carbonated from the main under pressure directly to the pump of the carbonator. This method has been found objectionable owing to the entrained air in the water which tends to separate and interfere both with the action of the pump and with the carbonating process of the liquid.

The objects of the present invention include means for releasing the air from the liquid and for effecting a multiple cooling action from the ice and the water melted therefrom.

For further comprehension of the invention, and of the objects and advantages, reference is had to the following description and accompany drawing, and to the appended claims in which the various features of the invention are more particularly pointed out.

Figure 1:
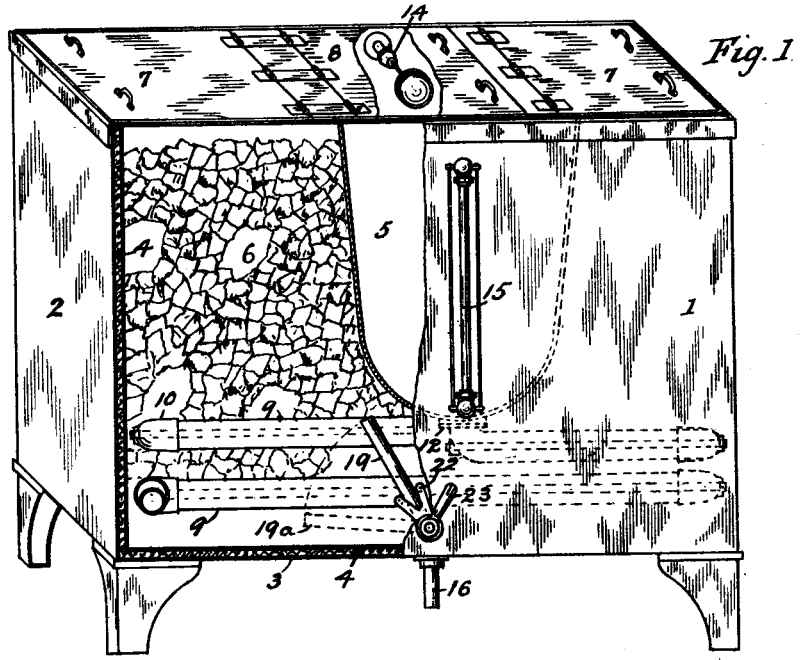
Figure 2:
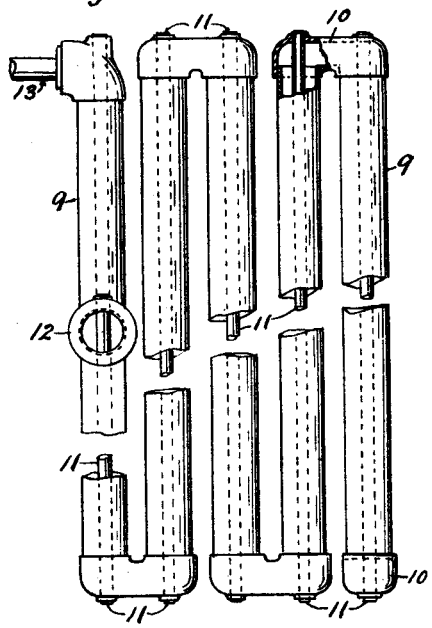
Figure 3:
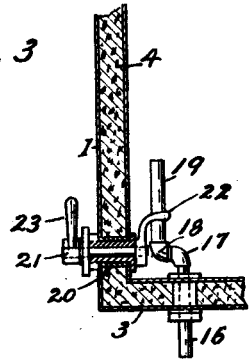

In the drawing Figure 1 shows a perspective view of the improved cooler, a portion of the casing thereof being broken away to show the interior parts. Figure 2 is an enlarged detail view of the cooling pipes, a portion thereof being shown in section. Figure 3 is a detail view showing means for regulating the discharge of the ice-water.

In the drawing the cooler comprises an outer casing or box represented by the side walls 1 and 2 and the bottom wall 3, these walls being preferably formed double and provided therebetween with an insulating filler material 4 as shown in cross section in Figs. 1 and 2.

Suitably supported within the box above the bottom wall thereof is a pre-cooling or water storage tank 5 arranged to divide the box into a pair of separate ice-chambers 6, closed at the top by the hinged cover 7, the tank 5 being similarly closed by the cover 8.

Supported from the bottom wall of the cooler box and below the tank 5 is a double coil of cooling pipes comprising a series of outer pipes 9 connected together at their ends by the elbow connections 10, the latter also serving to connect the opposite ends of a multiplicity of open-end tubes 11, which extend lengthwise through and centrally of the outer pipes 9 and form with respect to the latter continuous annular circulating spaces or cooling-passages extending from end to end of the double coil, the inlet end of which is connected by the flange 12 to the bottom of the tank 5, and the outlet end having a reduced coupling pipe 13, constituting a discharge connection for the cooled liquid. The opposite ends of the central tubes 11 are open to the interior of the ice chambers to allow the water from the melting ice to circulate therethrough, the ends of these tubes being expanded into the elbow connections 10 of the outer pipes to form a close joint therewith and prevent the mixture of the ice-water with the liquid to be cooled.

As shown in Figure 1, the space within the cooler-box on the opposite sides of the tank 5 and above the cooling pipes 9 are filled with cracked ice which comes in direct contact both with the walls of the storage tank and with the cooling pipes, and in its melting action the water therefrom passes downwardly between the pipes 9 and into the inner tubes 11, the level of the ice-water with respect to these inner tubes being regulated by an adjustable drain connection.

This drain connection for the ice-water, as shown in Fig. 3, comprises a pipe 16 extending through and in fixed relation to the bottom wall 3 of the cooler-box, the upper end of the pipe within the box being provided with an elbow 17 having a close nipple connection on which is mounted to turn a second elbow 18, the latter having a projecting inlet pipe 19 through which the drain water passes by way of the elbows 17 and 18 and the discharge pipe 16. For effecting the adjustable swinging movement of the inlet pipe 19, the front side wall of the cooler-box is provided in fixed relation with a perforated fitting 20 arranged to rotatively receive a stem 21, on the inner end of which is fixed a yoke having fork shaped driver ends 22 engaging the pipe 19 at opposite sides. On its outer end the stem 21 is fixedly provided with a handle member 23, by means of which the stem may be rotated and the movement thereof transmitted through the yoke and fork ends 22 to vary the draining position of the inlet pipe 19, as indicated by the dotted lines 19ª, and secure the desired level of the ice-water with respect to the inner tube 11.

The liquid to be carbonated is supplied from the pressure main to the pre-cooling or storage tank 5 at a constant level by means of the float-actuated valve 14, the external gauge glass 15 indicating the height thereof within the tank. As the latter is open at the top for the admission of atmospheric air through the joint spaces of its relatively loosely hinged cover 8, the air carried by the water into the tank is free to escape therefrom during the period it remains therein, and during which time the liquid receives the first cooling action from the engagement of the ice with the walls of the storage tank. From the latter the liquid flows by gravity through the bottom connection 12 and the annular circulating spaces between the outer pipes 9 and the inner tubes 11, receiving a second cooling action by contact between the ice and the outer pipes 9, and a third cooling effect from the flow through the inner tubes of the water from the melting ice, the drain for the ice-water being adjusted with respect to the flow of cooled liquid to afford substantially common temperatures therefor. From the circulating spaces of the cooler pipes the cooled liquid is discharged through the coupling 13 which is arranged to extend through a wall of the cooler and be connected to the inlet of a carbonator pump.

While the draining device or regulator may be adjusted to maintain a definite flow of ice-water through the inner tubes 11, it will be obvious that the adjustment may be set to remove the drain water as rapidly as the same may be formed. In which case the inner tubes will remain dry and, owing to the variation in temperature of the air between the top and bottom of the cooler box, will serve as ducts for the natural flow of air therethrough, resulting in a corresponding variation in the water to be cooled. It will also be seen that the mouth of the inlet pipe 19 may be changed from one level to another with respect to the cooling-passages, and thereby effect variations in the temperature of the interior of the pipes 9, corresponding to the requirements of different liquids to be carbonated.

What I claim as my invention and desire to secure by Letters Patent, is:

1. A liquid cooler including in combination, an ice-chamber, a pre-cooling tank embedded in the ice and into which the liquid is introduced, a pipe line in the ice-chamber, said pipe line providing a series passage through which all of the liquid passes from the pre-cooling tank to the outside of the ice-chamber, means for cooling the interior of said pipe line, said means including a plurality of tubes forming passages into and out of said pipe line at intervals throughout its length, said tubes having their opposite ends communicating with said ice-chamber and providing a multiple system of cooling-passages through the series liquid passage, and means for altering the cooling effect of said system of cooling-passages, whereby to cause variations in the temperature of the cooled liquid.

2. A liquid cooler including in combination, an ice-chamber, a pre-cooling tank embedded in the ice and into which the liquid is introduced, a pipe line in the ice-chamber, said pipe line providing a series passage through which all of the liquid passes from the pre-cooling tank to the outside of said ice-chamber, means for cooling the interior of said pipe line, said means including a plurality of tubes forming passages into and out of said pipe line at intervals throughout its length, said tubes having their opposite ends communicating with said ice-chamber and providing a multiple system of cooling-passages through the series liquid passage, and means for adjusting the cooling conditions within said ice-chamber in such a manner that said multiple system becomes filled with either iced water or cooled air, or combinations thereof.

3. A liquid cooler including in combination, an ice-chamber, a pre-cooling tank embedded in the ice and into which the liquid is introduced, a series passage or pipe line connected to the bottom of the tank and positioned beneath the level of the ice or iced water, the other end of said pipe line passing to the outside of the ice-chamber, means for cooling the interior of said pipe line, said means including a multiplicity of tubes forming cooling-passages into and out of said pipe line at intervals throughout its length, and means for altering the cooling effect of said cooling-passages, said altering means being in the form of a liquid-level controlling pipe within the ice-chamber, said pipe having a mouth movable from one level to another and having an outlet to the exterior of said ice-chamber, and a handle operable from the outside of said ice-chamber for changing the level of said mouth with respect to the level of said multiple cooling passages.

In testimony whereof, I have signed my name to this specification, this 14th day of June, 1926.

HENRY J. IRWIN.